US010661709B2

(12) United States Patent
Kim et al.

(10) Patent No.: US 10,661,709 B2
(45) Date of Patent: May 26, 2020

(54) LIGHT EMITTING DEVICE FOR AIR VENT OF AUTOMOBILE

(71) Applicant: Nifco Korea Inc., Chungcheongnam-do (KR)

(72) Inventors: Keun Heung Kim, Chungcheongnam-do (KR); Jae Wook Jung, Chungcheongnam-do (KR); Yun Sup Hwang, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 0 days.

(21) Appl. No.: 16/468,268

(22) PCT Filed: Dec. 11, 2017

(86) PCT No.: PCT/KR2017/014439
§ 371 (c)(1),
(2) Date: Jun. 10, 2019

(87) PCT Pub. No.: WO2018/106081
PCT Pub. Date: Jun. 14, 2018

(65) Prior Publication Data
US 2020/0070623 A1 Mar. 5, 2020

(30) Foreign Application Priority Data
Dec. 9, 2016 (KR) ........................ 10-2016-0167733

(51) Int. Cl.
*B60Q 3/62* (2017.01)
*B60H 1/00* (2006.01)
(Continued)

(52) U.S. Cl.
CPC ........... *B60Q 3/62* (2017.02); *B60H 1/00592* (2013.01); *B60H 1/3421* (2013.01); *B60Q 3/64* (2017.02);
(Continued)

(58) Field of Classification Search
CPC ......... B60Q 3/62; B60Q 3/64; B60Q 3/00–88
(Continued)

(56) References Cited

U.S. PATENT DOCUMENTS

| 4,916,591 A * | 4/1990 | Schiele | B60H 1/3414 362/23.15 |
| 2009/0298406 A1* | 12/2009 | Norbury, Jr. | B60H 1/34 454/69 |
| 2013/0215637 A1* | 8/2013 | An | B60Q 3/64 362/580 |

FOREIGN PATENT DOCUMENTS

| JP | H05301520 A | 11/1993 |
| JP | 3590749 B2 | 11/2004 |

(Continued)

OTHER PUBLICATIONS

International Search Report and Written Opinion for the International Patent Application No. PCT/KR2017/014439, dated Apr. 10, 2018, 9 pages.

*Primary Examiner* — Sean P Gramling

(57) ABSTRACT

The present invention comprises: an LED; a light guide; a diffusion plate; and an air vent housing, wherein at least one shielding protrusion having a receiving portion is formed to protrude from the rear of the air vent housing having the irradiation hole formed therethrough into which the diffusion plate is inserted to be fixed, wherein a bent extension portion is formed to extend from one side of the light guide such that a locking protrusion inserted into the receiving portion formed in the shielding protrusion protrudes from the front thereof and an inflow portion, through which the light generated from the LED is introduced, protrudes from the rear thereof.

3 Claims, 7 Drawing Sheets

(51) Int. Cl.
  *F21V 8/00* (2006.01)
  *B60H 1/34* (2006.01)
  *B60Q 3/64* (2017.01)
  *F21S 9/02* (2006.01)
  *F21Y 115/10* (2016.01)

(52) U.S. Cl.
  CPC ............... *G02B 6/0008* (2013.01); *F21S 9/02* (2013.01); *F21Y 2115/10* (2016.08)

(58) Field of Classification Search
  USPC ........................................................ 362/480
  See application file for complete search history.

(56) References Cited

FOREIGN PATENT DOCUMENTS

| | | | |
|---|---|---|---|
| JP | 2007064806 A | 3/2007 |
| JP | 2010100111 A | 5/2010 |
| JP | 2014043220 A | 3/2014 |
| KR | 101421929 B1 | 7/2014 |

\* cited by examiner

LIGHT EMITTING DEVICE FOR AIR VENT OF AUTOMOBILE

CROSS-REFERENCE TO RELATED APPLICATIONS

This application is a national phase claiming the benefit of and priority to International Patent Application No. PCT/KR2017/014439, entitled "LIGHT EMITTING DEVICE FOR AIR VENT OF AUTOMOBILE", filed Dec. 11, 2017, which claims priority to Korean Patent Application No. 10-2016-0167733, filed Dec. 9, 2016, which are hereby incorporated by reference in their entireties.

TECHNICAL FIELD

Embodiments relate to a light emitting device for an air vent of an automobile and, more particularly, to a light emitting device for an air vent of an automobile, which allows light generated by an LED to be emitted at the same illuminance through an irradiation hole formed in an air vent housing.

BACKGROUND ART

In general, an air conditioning system is provided in an interior of an automobile and used to adjust the temperature of the vehicle interior depending on a season.

Cold and hot air generated by the air conditioning system is discharged into the vehicle interior by being introduced into an air ventilation opening provided in a console and an instrument panel installed in the interior of the automobile through a duct.

Meanwhile, by installing, in the air ventilation opening, an air vent including a damper for adjusting an opening level of the duct, a knob for adjusting a movement of the damper, and a housing coupled to be fixed to the front of the duct in which the knob is provided, a person in the vehicle interior may control the knob to adjust the opening level of the duct and the air direction and thereby adjust an amount of air to be discharged.

However, such an existing air vent has a low visibility and thus, it is difficult to determine whether the air vent is open or closed, during night driving with an insufficient quantity of light in an interior.

Thus, in the past, to solve the issue described above, a light emitting device for an air vent of an automobile including an LED for emitting light while being supplied with power from a battery, a light guide for guiding the light generated by the LED, a diffusion plate for widely diffusing the light guided by the light guide, and an air vent housing having an irradiation hole formed therethrough to allow the light that is widely diffused by the diffusion plate to be irradiated to the outside of the air vent was developed and used.

In the existing light emitting device for an air vent of an automobile, the diffusion plate is inserted into the irradiation hole to be fixed in a direction from the rear to the front of the air vent housing, the light guide is installed in the rear of the diffusion plate inserted into the irradiation hole, and the LED for emitting light while being supplied with power from the battery is installed on one side of the light guide installed in the diffusion plate. When the LED emits light, the light generated by the LED is guided to the other side of the light guide and widely diffused by the diffusion plate at the same time, and thereby irradiated to the outside of the air vent housing of the air vent through the irradiation hole.

However, in the existing light emitting device for an air vent of an automobile, since the irradiation hole, the diffusion plate, and the light guide formed in the air vent housing are formed in the same length, when the light emitted from the LED is directly supplied to one side of a light emitting portion, the light irradiated to the one side of the light emitting portion is irradiated bright through the one side of the irradiation hole formed in the air vent housing at first, and the remaining light is irradiated while moving to the other side of the light guide, the other side of the diffusion plate, and the other side of the irradiation hole. Thus, an illuminance of a site to which the light of the LED is irradiated directly is bright, whereas an illuminance of the light irradiated through the one side and the other side of the irradiation hole is dark, and thus the overall illuminance of the diffusion plate is not uniform.

Meanwhile, in the past, the non-uniform illuminance of the light irradiated through the one side and the other side of the irradiation hole degraded the appearance of the vehicle interior and lowered the marketability of the vehicle.

PRIOR ART DOCUMENT (Patent Document 1) Korean Patent No. 10-1421929 (Registered on: Jul. 16, 2014)

DISCLOSURE OF INVENTION

Technical Goals

To solve the conventional issue described above, an aspect provides a light emitting device for an air vent of an automobile, that allows light generated by an LED to be emitted at the same illuminance through an irradiation hole formed in an air vent housing.

Technical Solutions

According to an aspect, to achieve the foregoing goals, there is provided a light emitting device for an air vent of an automobile, the light emitting device including an LED (100) for emitting light while being supplied with power from a battery, a light guide (200) for guiding the light emitted from the LED (100), a diffusion plate (300) for widely diffusing the light guided by the light guide (200), and an air vent housing (400) having an irradiation hole (410) formed therethrough to allow the light that is widely diffused by the diffusion plate (300) to be irradiated to the outside, wherein at least one shielding protrusion (420) having a receiving portion (421) is formed to protrude from the rear of the air vent housing (400) having the irradiation hole (410) formed therethrough into which the diffusion plate (300) is inserted to be fixed, wherein a bent extension portion (210) is formed to extend from one side of the light guide (200) such that a locking protrusion (211) inserted into the receiving portion (421) formed in the shielding protrusion (420) protrudes from the front thereof and an inflow portion (212), through which the light emitted from the LED (100) is introduced, protrudes from the rear thereof.

Meanwhile, the shielding protrusion (420) is formed at a location on which the light emitted from the LED (100) is concentrated such that the intensity of the light irradiated through the irradiation hole (410) may be adjusted by adjusting the illuminance of the LED (100).

Further, a refraction protrusion (213) protruding outward is formed in the extension portion (210) such that the light emitted from the LED (100) may be irradiated at the same illuminance through the irradiation hole (410) while being refracted by the refraction protrusion (213).

Effects

According to embodiments, light emitted from an LED is refracted by a refraction protrusion and a locking protrusion and irradiated uniformly through an irradiation hole at an illuminance intended by a designer. The light emitted from the LED and introduced into the locking protrusion received in a receiving portion through an inflow portion of an extension portion does not leak to the outside by means of a shielding protrusion, and moves to the other side of a light guide at a uniform illuminance. The light moving to the other side of the light guide is diffused by a diffusion plate and provides illumination at the same illuminance through the irradiation hole formed in an air vent housing. Therefore, the light generated by the LED at the illuminance desired by the designer when manufacturing a vehicle may be readily emitted at the same illuminance through the irradiation hole formed in the air vent housing.

Meanwhile, when the light emitted from the LED is emitted at the same illuminance through the irradiation hole formed in the air vent housing, the appearance of the vehicle interior improves, and the marketability of the vehicle also improves, which is an effective and beneficial invention.

BEST MODE FOR CARRYING OUT THE INVENTION

Hereinafter, the technical configuration of the embodiments will be described in detail with reference to the accompanying drawings.

Figure 1:
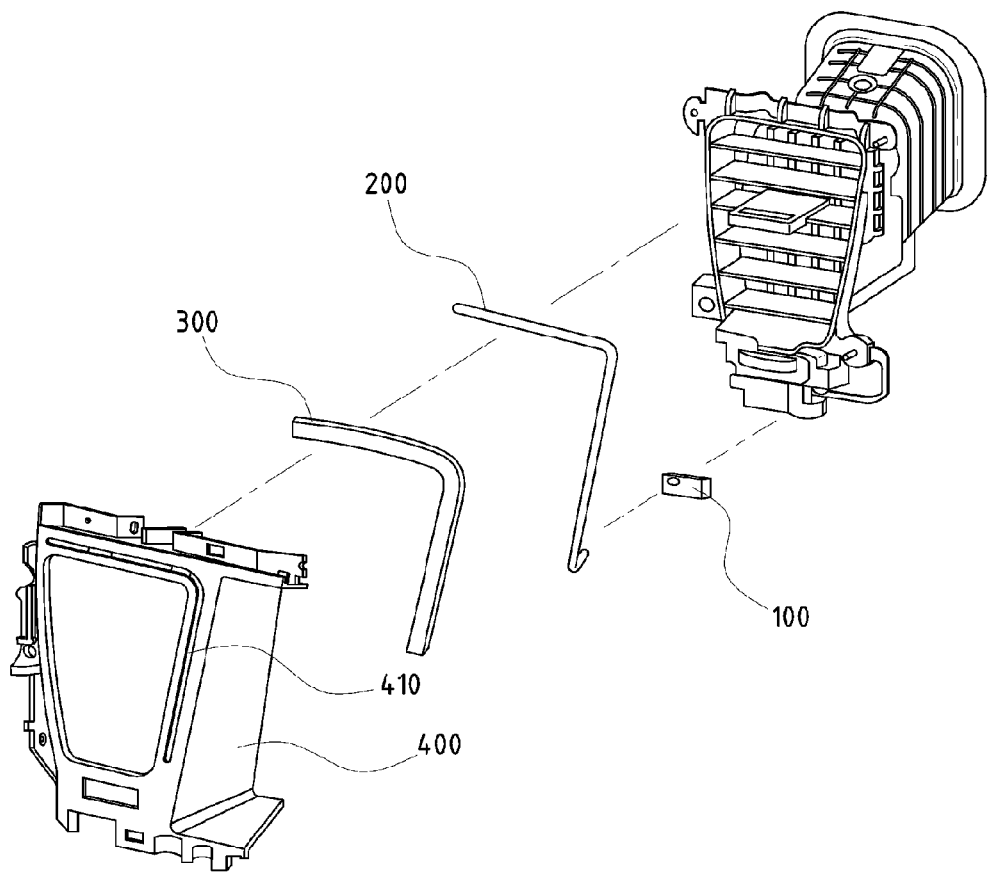
FIG. 1 is an exploded perspective view illustrating a coupling state of a light emitting device for an air vent according to an embodiment.
Figure 2:
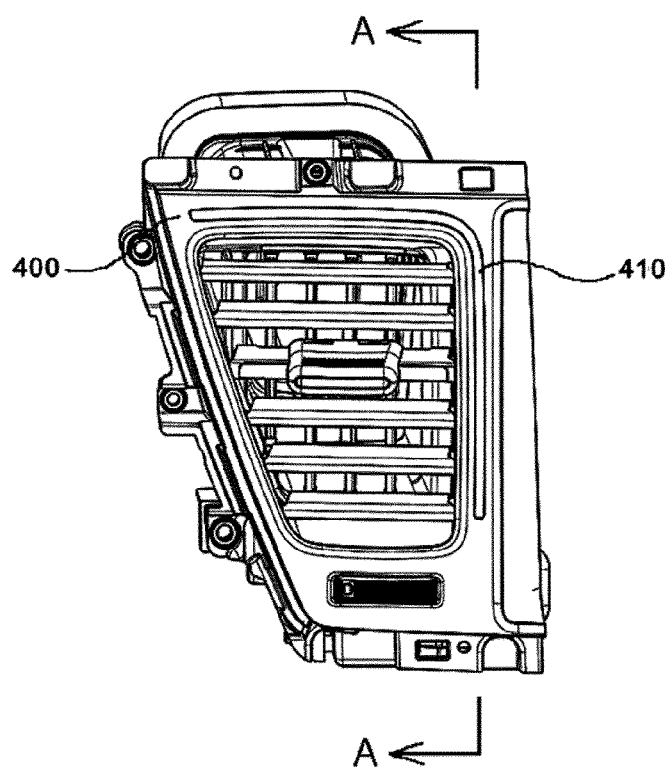
FIG. 2 is a perspective view illustrating an installation state of a light emitting device for an air vent according to an embodiment.
Figure 3:
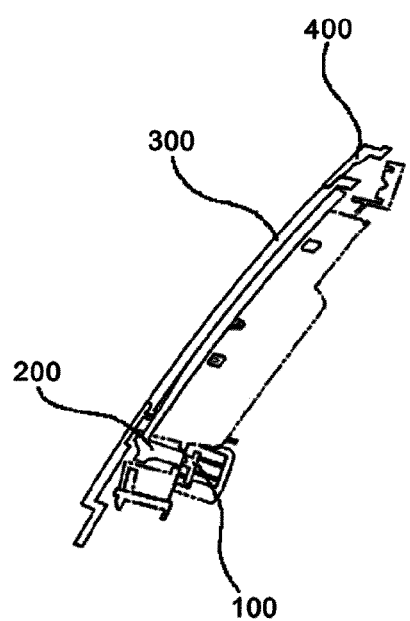
FIG. 3 is a cross-sectional view taken along a line A-A of FIG. 2.
Figure 4:
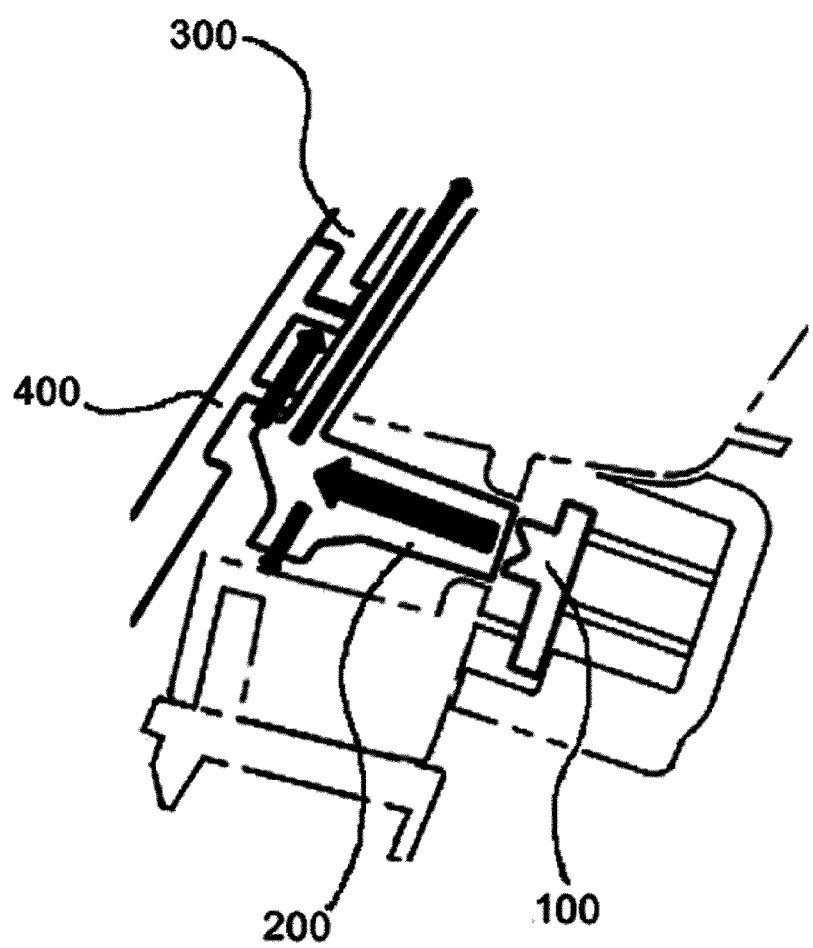
FIG. 4 is an enlarged cross-sectional view of essential parts illustrating an installation state of a light emitting device for an air vent according to an embodiment.
Figure 5:
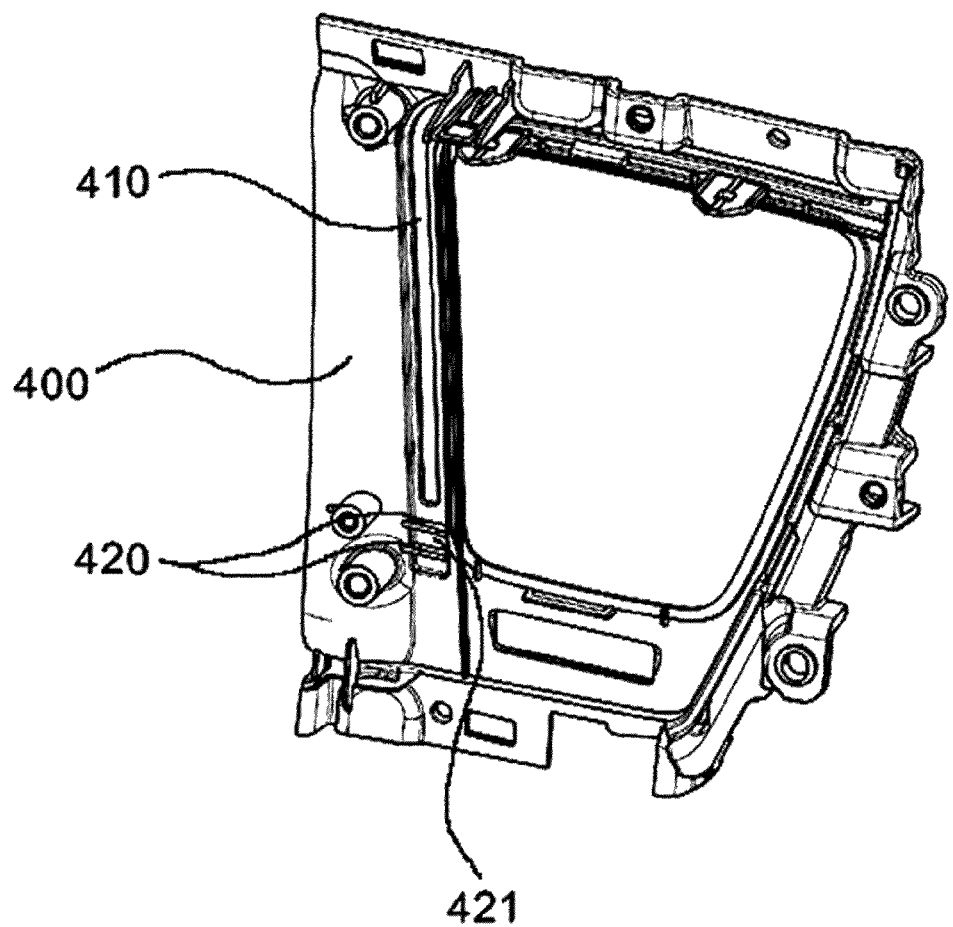
FIG. 5 is a rear perspective view illustrating the rear of an air vent housing of a light emitting device for an air vent according to an embodiment.
Figure 6:
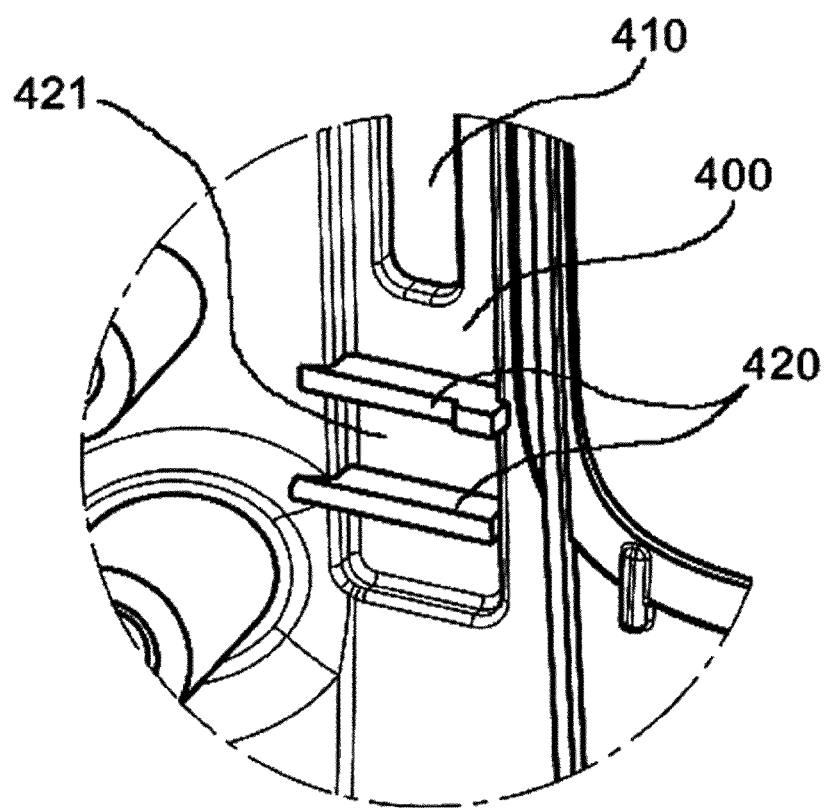
FIG. 6 is an enlarged perspective view illustrating essential parts of an air vent housing of a light emitting device for an air vent according to an embodiment.
Figure 7:
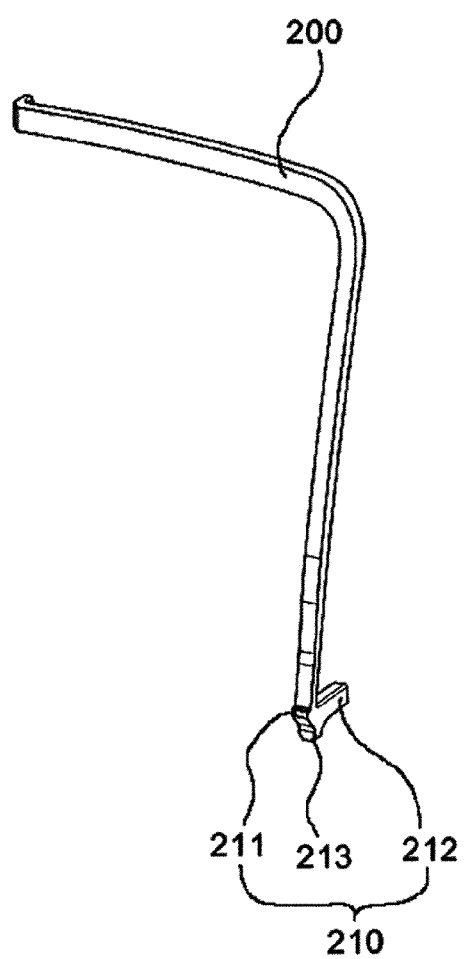
FIG. 7 is a perspective view illustrating a light guide of a light emitting device for an air vent according to an embodiment.

FIG. 1 is an exploded perspective view illustrating a coupling state of a light emitting device for an air vent according to an embodiment, FIG. 2 is a perspective view illustrating an installation state of the light emitting device for an air vent according to an embodiment, FIG. 3 is a cross-sectional view taken along a line A-A of FIG. 2, FIG. 4 is an enlarged cross-sectional view of essential parts illustrating an installation state of the light emitting device for an air vent according to an embodiment, FIG. 5 is a rear perspective view illustrating the rear of an air vent housing of the light emitting device for an air vent according to an embodiment, FIG. 6 is an enlarged perspective view illustrating essential parts of the air vent housing of the light emitting device for an air vent according to an embodiment, and FIG. 7 is a perspective view illustrating a light guide of the light emitting device for an air vent according to an embodiment.

As shown in FIGS. 1 through 4, a light emitting device for an air vent of an automobile includes an LED (100) for emitting light while being supplied with power from a battery (not shown), a light guide (200) for guiding the light emitted from the LED (100), a diffusion plate (300) for widely diffusing the light guided by the light guide (200), and an air vent housing (400) having an irradiation hole (410) formed therethrough to allow the light that is widely diffused by the diffusion plate (300) to be irradiated to the outside.

Meanwhile, as shown in FIGS. 3 through 6, at least one shielding protrusion (420) having a receiving portion (421) is formed to protrude from the rear of the air vent housing (400) having the irradiation hole (410) formed therethrough into which the diffusion plate (300) is inserted to be fixed.

Further, as shown in FIGS. 3, 4, and 7, a bent extension portion (210) is formed to extend from one side of the light guide (200) such that a locking protrusion (211) inserted into the receiving portion (421) formed in the shielding protrusion (420) protrudes from the front thereof and an inflow portion (212), through which the light emitted from the LED (100) is introduced, protrudes from the rear thereof.

Meanwhile, the shielding protrusion (420) is formed at a location on which the light emitted from the LED (100) is concentrated such that the intensity of the light irradiated through the irradiation hole (410) may be adjusted by adjusting the illuminance of the LED (100).

Further, a refraction protrusion (213) protruding outward is formed in the extension portion (210) such that the light emitted from the LED (100) may be irradiated at the same illuminance through the irradiation hole (410) while being refracted by the refraction protrusion (213).

*In the configuration as described above, the diffusion plate (300) is inserted into the irradiation hole (410) to be fixed in a direction from the rear to the front of the air vent housing (400), and the light guide (200) is installed in the rear of the diffusion plate (300) inserted into the irradiation hole (410).

In this example, the locking protrusion (211) formed to protrude from the front of the extension portion (210) of the light guide (200) is positioned the outer side of the shielding protrusion (420) formed in the rear of the air vent housing (400), or installed to be inserted into the receiving portion (421) formed between the shielding protrusion (420) and the shielding protrusion (420), such that even when the light emitted from the LED (100) is introduced into the locking protrusion (211), the shielding protrusion (420) prevents a leakage of the light into the irradiation hole (410), and thus the light emitted from the LED (100) deflecting toward one side of the irradiation hole (410) is not irradiated.

After the light guide (200) is installed in the diffusion plate (300) as described above, the LED (100) for emitting light while being supplied with power from the battery is positioned to be in close contact with the end of the inflow portion (212) formed in the rear of the extension portion (210).

Thus, the light emitted when the LED (100) is turned on while being supplied with power from the battery is introduced through the inflow portion (212) of the light guide (200) and moves while being primarily refracted by the refraction protrusion (213), and the light moving while being refracted by the refraction protrusion (213) moves to the locking protrusion (211) inserted into the receiving portion (421) formed in the shielding protrusion (420).

In this example, even when a large quantity of the light emitted from the LED (100) is introduced into the locking protrusion (211), the light deflecting toward one side of the irradiation hole (410) is not irradiated by the inner side of the shielding protrusion (420) and the rear of the air vent housing (400) in which the irradiation hole (410) is not formed since the locking protrusion (211) of the extension portion (200) formed to be longer than the diffusion plate (300) inserted into the irradiation hole (410) is inserted into the receiving portion (421) formed in the shielding protrusion (420).

Meanwhile, the light secondarily refracted by the locking protrusion (211) is induced toward the other side of the light guide (200) being in contact with the diffusion plate (300), and the light inducted toward the other side of the light guide (200) is widely diffused by the diffusion plate (300) and irradiated to the outside at the same illuminance through the irradiation hole (410) formed through the air vent housing (400).

In this example, the illuminance at which the light is irradiated through the irradiation hole (410) is determined by adjusting the brightness of the LED (100) such that the light is irradiated at a uniform illuminance using the refraction of the light refracted by the locking protrusion (211) and the refraction protrusion (213).

DESCRIPTION OF REFERENCE NUMERALS

100: LED
200: Light guide
210: Extension portion
211: Locking protrusion
212: Inflow portion
213: Refraction protrusion
300: Diffusion plate
400: Air vent housing
410: Irradiation hole
420: Shielding protrusion
421: Receiving portion

The invention claimed is:

1. A light emitting device for an air vent of an automobile, the light emitting device comprising:
    an LED for emitting light while being supplied with power from a battery, a light guide for guiding the light emitted from the LED, a diffusion plate for widely diffusing the light guided by the light guide, and an air vent housing having an irradiation hole formed therethrough to allow the light that is widely diffused by the diffusion plate to be irradiated to the outside, wherein at least one shielding protrusion having a receiving portion is formed to protrude from the rear of the air vent housing having the irradiation hole formed therethrough into which the diffusion plate is inserted to be fixed, wherein a bent extension portion is formed to extend from one side of the light guide such that a locking protrusion inserted into the receiving portion formed in the shielding protrusion protrudes from the front thereof and an inflow portion, through which the light emitted from the LED is introduced, protrudes from the rear thereof.

2. The light emitting device of claim 1, wherein the shielding protrusion is formed at a location on which the light emitted from the LED is concentrated.

3. The light emitting device of claim 1, wherein a refraction protrusion protruding outward is formed in the extension portion.

* * * * *